(12) United States Patent
Jurrens

(10) Patent No.: US 6,193,005 B1
(45) Date of Patent: Feb. 27, 2001

(54) MOTORCYCLE AIR BAG SUSPENSION SYSTEM

(76) Inventor: Jesse A. Jurrens, 4226 11th Ave., NW., Watertown, SD (US) 57201

(*) Notice: Subject to any disclaimer, the term of this patent is extended or adjusted under 35 U.S.C. 154(b) by 0 days.

(21) Appl. No.: 09/356,406

(22) Filed: Jul. 16, 1999

Related U.S. Application Data

(63) Continuation-in-part of application No. 08/906,112, filed on Jul. 25, 1997, now Pat. No. 6,003,628.

(51) Int. Cl.$^7$ .................................................... B62D 61/02
(52) U.S. Cl. ........................................... 180/227; 280/283
(58) Field of Search .................................... 180/227, 219, 180/358; 280/284, 283, 285, 124.177

(56) References Cited

U.S. PATENT DOCUMENTS

| | | | |
|---|---|---|---|
| 3,866,894 | * 2/1975 | Sweet et al. | 267/31 |
| 4,439,986 | * 4/1984 | Snitgen | 60/547.1 |
| 4,494,770 | * 1/1985 | Reynolds | 280/685 |
| 4,619,578 | * 10/1986 | Routledge | 414/498 |
| 5,348,112 | * 9/1994 | Vaillancourt | 180/227 |
| 5,403,028 | * 4/1995 | Trimble | 280/284 |
| 5,487,443 | * 1/1996 | Thurm | 180/227 |
| 5,664,649 | * 9/1997 | Thompson et al. | 188/314 |

\* cited by examiner

Primary Examiner—Brian L. Johnson
Assistant Examiner—Avraham H. Lerner
(74) Attorney, Agent, or Firm—Hugh D. Jaeger

(57) ABSTRACT

A suspension system for a motorcycle, including a motorcycle mainframe, a swing arm pivotally mounted to the motorcycle main frame about a pivot axis, and an air bag suspension unit. The air bag suspension unit includes at least one air bag constructed of an elastomeric material. Without tools, the rider can adjust the air pressure in the air bags while operating the motorcycle by use of a power switch operably connected to a small compressor mounted on the motorcycle. The air bag(s) are housed within a slidable housing and which is mounted at one end to the slidable housing and its other end to mounting brackets on the motorcycle main frame. The housing is attached at its front end to the motorcycle main frame and at its back end to the swing arm. The housing also includes slide rods fixed to its forward end which slide within a pair of bushings. One alternative embodiment incorporates a conventional shock absorber along with the air bags to improve the handling of the motorcycle on rough or uneven terrain. A second alternative embodiment incorporates hydraulic mounts and self-contained range-of motion limiters.

12 Claims, 12 Drawing Sheets

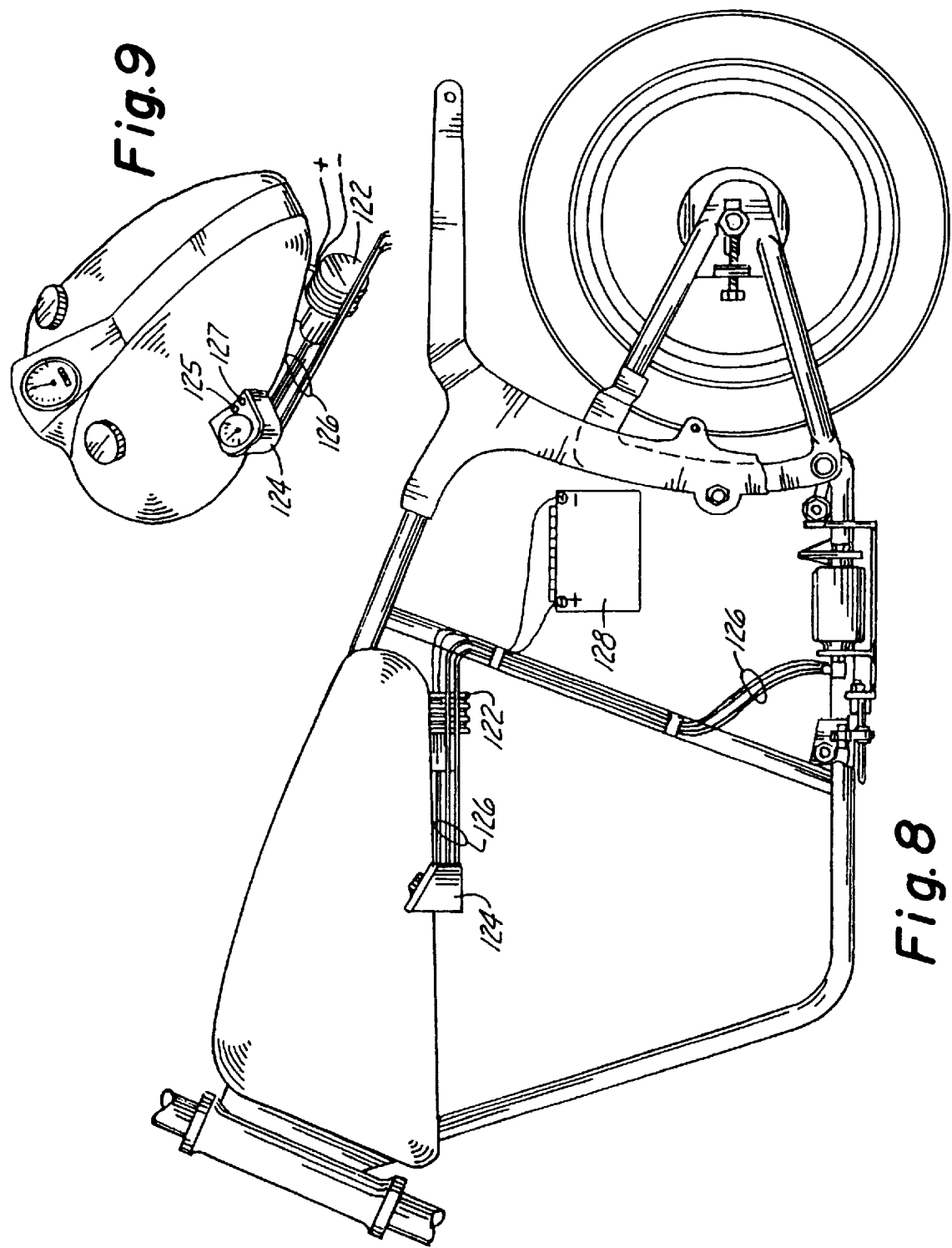

MOTORCYCLE AIR BAG SUSPENSION SYSTEM

CROSS REFERENCES TO CO-PENDING APPLICATIONS

This patent application is a continuation-in-part of U.S. patent application Ser. No. 08/906,112 entitled "Motorcycle Air Bag Suspension System" filed on Jul. 25, 1997, now U.S. Pat. No. 6,003,628, Dec. 21, 1999, by the same inventor(s).

BACKGROUND OF THE INVENTION

1. Field of the Invention

This invention relates generally to motorcycles, and more particularly to motorcycle suspension systems.

2. Description of the Prior Art

Harley-Davidson is a well known motorcycle manufacturer that manufactures a popular suspension system for its motorcycles under the trademark SOFTAIL®. The SOFTAIL® suspension has no visible suspension components and thus mimics the desirable appearance of the Harley-Davidson "hard tail" frame in which the connecting arms of the rear wheel are rigidly fixed to the frame. The SOFTAIL® suspension system incorporates a swing arm and shock absorbers which dampens the effect of the rear wheel attachment, thereby affording an advantage over the "hard tail" frame by providing some suspension cushioning that improves the handling and riding comfort of the motorcycle.

In the SOFTAIL® suspension system, the swing arm pivotally attaches to the struts of the motorcycle main frame, thus enabling the rear wheel to arcuately move independently of the frame. The swing arm includes a pair of wheel mounts located on a wheel axis spaced to receive the rear wheel. A pair of arms extending from each of the wheel mounts includes a connector connecting each pair of arms. Each connector is joined to the other connector by an upper transverse cross member and a lower transverse cross member. An intermediate transverse cross member extends through the connectors and through the frame struts of the motorcycle main frame. The swing arm is pivotal about this intermediate transverse cross member. The connectors have the same general size and shape as the frame struts of the main frame. Each connector is positioned adjacent and inside the corresponding frame struts so they are hidden from view.

The standard or stock SOFTAIL® suspension system uses two shock absorbers mounted in parallel relationship with the motorcycle main frame. One end of each shock absorber is attached to the main frame and the other end is connected to a projection extending forwardly from the lower transverse cross member of the swing arm. The projection is adapted to receive a bolt or pin which connects the shock absorber to the projection. The main frame of the motorcycle hides the projection and shock absorbers from view, thereby retaining the aesthetic appearance of the desirable Harley-Davidson "hard tail" frame.

As mentioned previously, the SOFTAIL® suspension system affords an advantage over the "hard tail" frame by providing some suspension cushioning that improves the handling and riding comfort of the motorcycle. However, as discussed in U.S. Pat. No. 5,487,443 (hereinafter the '443 patent), significant disadvantages remain. For example, the ride remains too harsh and uncomfortable because of the very short travel of the shock absorbers.

As mentioned in the '443 patent, the maximum vertical movement of the rear wheel relative to the main frame is limited to two inches in either vertical direction before the swing arm contacts the main frame. The shock absorbers, have an even smaller maximum travel of 1.5 inches, 0.75 inches in either direction from a center position. The result is that while the rear wheel may travel two inches in one direction from its centered position, the shock absorbers can only travel a distance of 0.75 inches. This limited distance of travel of the shock absorber results in a hard, uncomfortable ride because all of the shock absorption must occur within this narrow range of movement.

Further, the short distance of travel mandates continual and rapid changes of the shock absorber shaft according to the movement of the wheel. Often, these directional changes in the shock absorber cannot occur as fast as necessary to create a smoother ride due to the inherent reluctance of the shock absorber to rapidly change directions. As discussed in the '443 patent, this inherent reluctance to rapid directional change is due to the relatively large momentum forces involved, the inertial drag caused by the movement of the oil or gas within the shock absorber, and the friction resistance caused by the seals and o-rings.

There have been previous attempts to improve the SOFTAIL® suspension system, but these attempts have had little success. For example, it has been attempted to increase the travel distance of the shock absorbers. This solution, however, offers only a modest improvement to the ride of the motorcycle because it does nothing for the responsiveness of the shock absorbers. Additionally, the range of movement of the swing arm is limited by the motorcycle frame, and therefore, the amount of travel of the shock absorber is also limited. Any further increases in the shock absorber travel requires modification to the motorcycle main frame, which is very undesirable. Other attempts have been made to improve the responsiveness of the shock absorbers, however, these attempts are hindered by the drag and friction forces discussed above.

In addition to the problems associated with the ride and handling of the standard of stock SOFTAIL® suspension, many motorcycle enthusiasts attempt to lower the rear of the motorcycle for aesthetic reasons, believing it improves the appearance of the motorcycle. Special kits are sold to allow the frame to be lowered, however, the lower of the rear of the motorcycle reduces the stroke on the suspension as discussed above resulting in a rougher ride.

Therefore, there remains a need for a motorcycle suspension that maintains the aesthetic appearance of the SOFTAIL® frame while improving the ride and comfort of the motorcycle. There also remains a need for a suspension system that enables the rear of the motorcycle to be raised and lowered when desired for aesthetic purposes.

SUMMARY OF THE INVENTION

A suspension system for a motorcycle, comprising a motorcycle main frame, a swing arm pivotally mounted to the motorcycle main frame about a pivot axis, and an air bag suspension unit. The swing arm has a pair of wheel mounts located on a wheel axis spaced to receive a wheel. The swing arm further includes a pair of arms extending from each of the wheel mounts and a connector connecting each pair of arms. Each connector is joined to the other connector by an upper transverse cross member and a lower transverse cross member. An intermediate transverse cross member extends along the swing arm pivot axis and through the connectors and is secured to the struts of the motorcycle main frame.

The air bag suspension unit includes at least one air bag constructed of an elastomeric material. The air bag is housed within a slidable housing and is mounted at one end to the slidable housing and at its other end to mounting brackets on the motorcycle main frame. The housing is attached at its forward end to the motorcycle main frame and is pivotally attached at its rearward to the lower transverse cross member of the swing arm. The housing also includes slide rods fixed to its forward end which slide within a pair of bushings.

In operation, when the rear wheel is caused to move upwardly or downwardly, the swing arm will also move arcuately upwardly or downwardly. The movement of the swing arm will pull or push the air bag housing forwardly or rearwardly as the case may be. If the rear wheel is caused to move upwardly with respect to the main frame, the slidable air bag housing is drawn rearwardly causing the slide bars to slide rearwardly through the bushings. The rearward movement of the air bag housing relative to the stationary transmission mount of the motorcycle main frame causes the air bag therebetween to compress, thus dampening the effect of the movement of the rear wheel. If the rear wheel is caused to move downwardly with respect to the main frame, the air bag housing is pushed forwardly causing the slide bars to slide forwardly through the bushings. The forward movement of the air bag housing relative to the stationary transmission mount of the motorcycle main frame causes the air bag therebetween to stretch thus dampening the effect of the movement of the rear wheel.

In the preferred embodiment, the air pressure in the air bags is adjustable on the move by the use of a power switch operably connected to a small compressor mounted on the motorcycle. An alternate embodiment incorporates a conventional shock absorber along with the air bags to improve the handling of the motorcycle on rough or uneven terrain.

Therefore, it is an object of the present invention to provide an improved suspension system for a Harley-Davidson SOFTAIL® motorcycle.

It is another object of the present invention to provide an improved suspension system for a Harley-Davidson SOFTAIL® motorcycle without having to modify the motorcycle main frame or swing arm.

It is yet another object of the present invention to provide a way to easily adjust the stiffness of a motorcycle's ride while on the move.

It is still a further object of the present invention to enable the ride height of the motorcycle to be adjustable.

It is still a further object of the present invention to permit the frame of a motorcycle to be lowered when the motorcycle is stopped or when traveling at low speeds for appearance purposes and to be able to quickly raise the frame once again when traveling at faster speeds.

Other objects, advantages, and novel features of the present invention will become apparent from the following detailed description of the invention when considered in conjunction with the accompanying drawings.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 8 illustrates a slide elevation view of a rear portion of a motorcycle frame showing the air bag suspension system of the present invention;

FIG. 9 illustrates a perspective view of the pressure gage and compressor used for the air bag suspension system of the present invention;

DETAILED DESCRIPTION OF THE PREFERRED EMBODIMENTS

Figure 1:
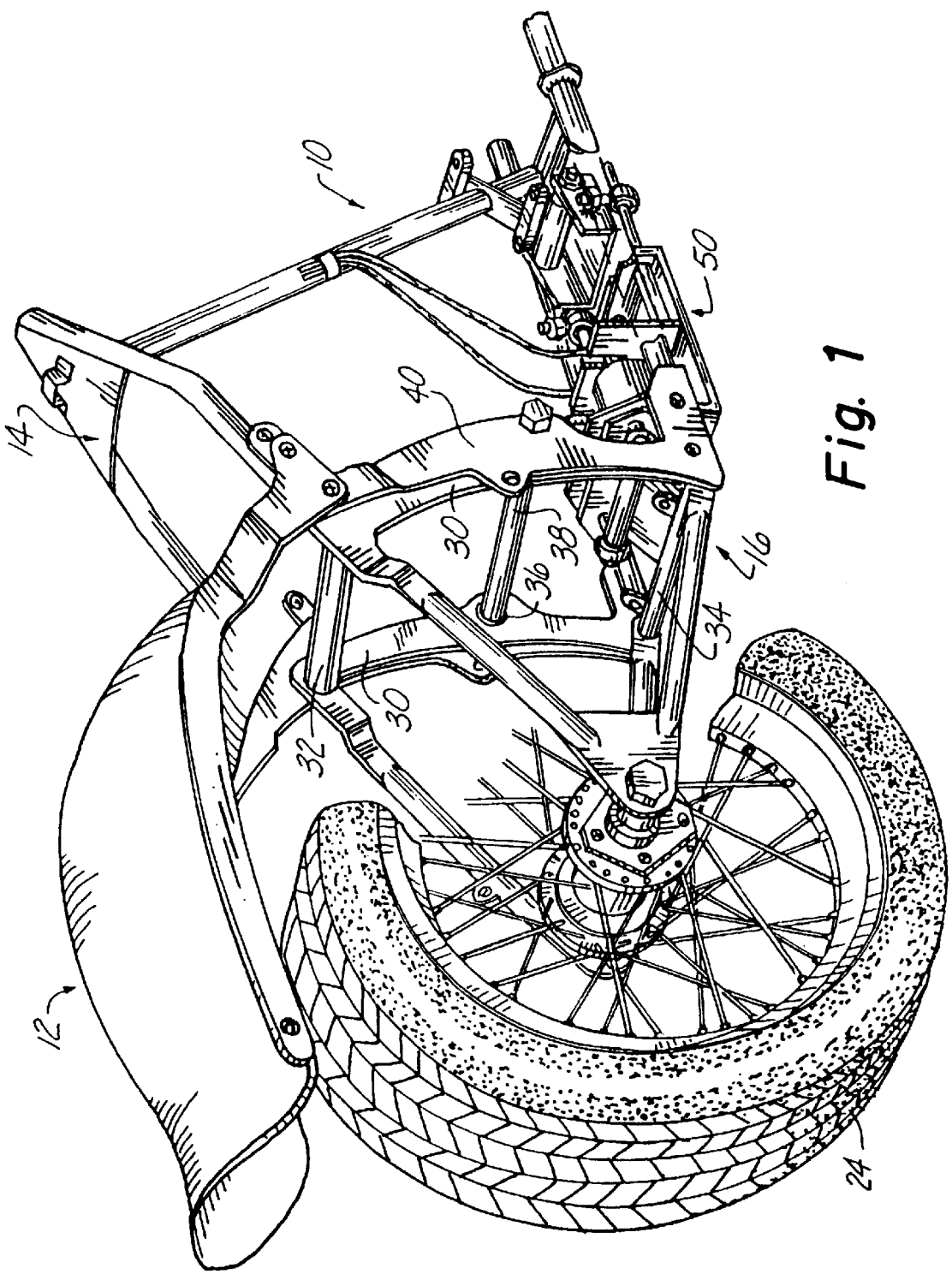
FIG. 1 illustrates a perspective view of a rear portion of a motorcycle showing the air bag suspension system of the present invention installed on the motorcycle.
Figure 2:
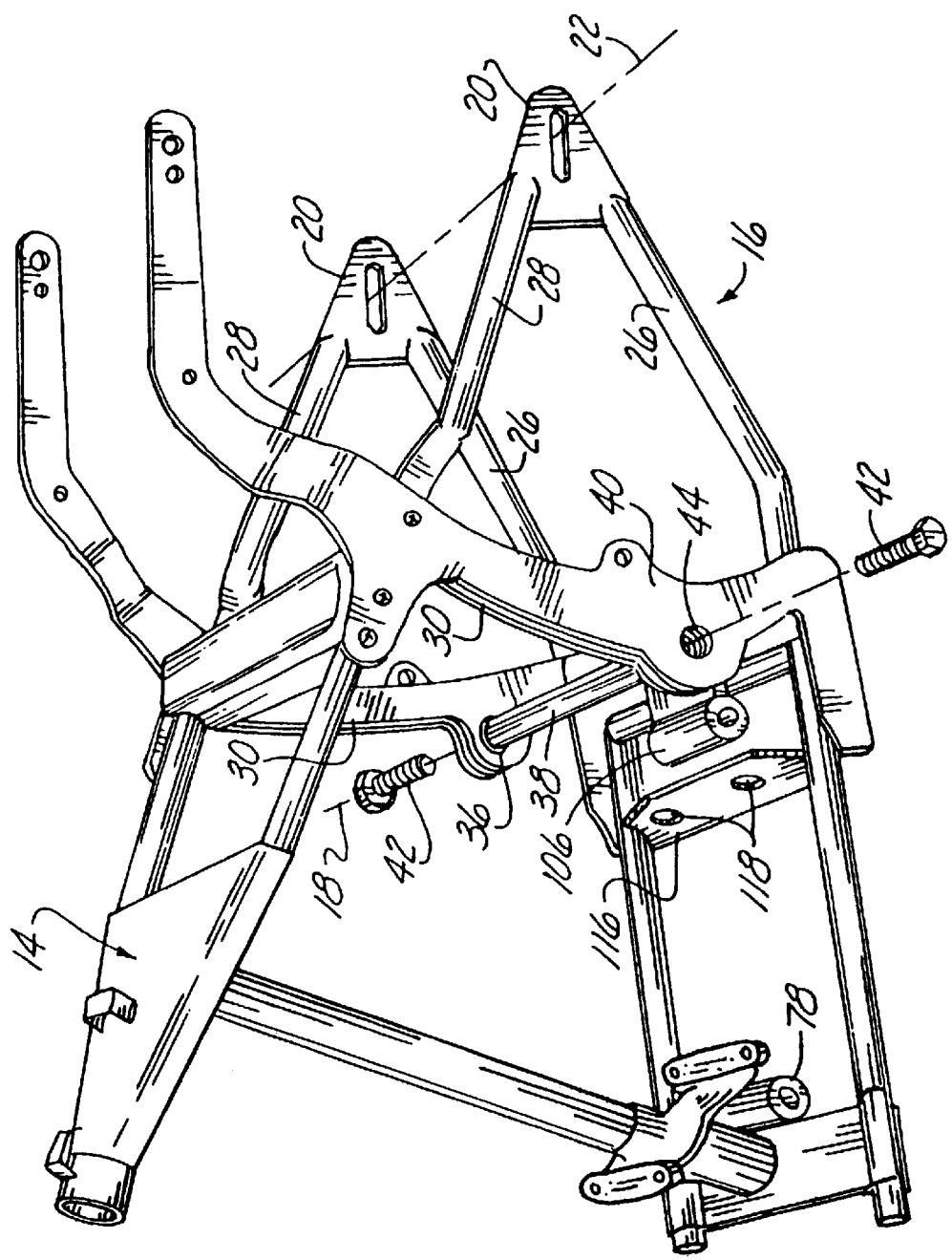
FIG. 2 illustrates a perspective view of a motorcycle main frame and swing arm.

Referring now to the drawings wherein like reference numerals designate identical or corresponding parts throughout the several views, FIG. 1 shows the air bag suspension system 10 installed on a motorcycle 12. The motorcycle 12 includes a main frame 14 and a swing arm 16 pivotally mounted to the motorcycle main frame 14 on a pivot axis 18 (FIG. 2). The motorcycle main frame 14 and swing arm 16 are symmetrical about the longitudinal axis of the motorcycle 12.

The swing arm 16 includes wheel mounts 20 (FIG. 2) located on the rear wheel axis 22 and are spaced to receive the rear wheel 24 (FIG. 1). The swing arm 16 further includes a pair of arms 26 and 28 extending forwardly from the wheel mounts 20. Connectors 30 (best viewed in FIG. 7) connect each pair of arms 26 and 28. The connectors 30 are joined by an upper transverse cross member 32 and a lower transverse cross member 34. Disposed within the connectors 30 at the pivot axis 18 are sealed bearings 36. An intermediate transverse cross member 38, disposed along the pivot axis 18, and having internal threads (not shown) at each end, extends through these sealed bearings 36 and is secured to the frame struts 40 on the motorcycle main frame 14 by a first set of bolts 42 which are received by apertures 44 in the frame struts 40 and which threadably engage the intermediate transverse cross member 38. The swing arm 16 is thereby pivotal with respect to the motorcycle main frame 14 around the intermediate transverse cross member 38 disposed along the pivot axis 18.

The air bag suspension system 10 is further comprised of an air bag suspension unit 50 (best viewed in FIG. 3) which includes a slidable housing 52, preferably two air bags 54 disposed therein, a forward connection 56, a rearward connection 58, and a resilient stop member 60. The slidable housing 52 is comprised of a bottom plate 62, to which is attached a front plate 64, a rear plate 66 and an intermediate plate 68. Attached to the front plate 64 are slide rods 70, the purpose of which will be discussed later. Disposed between the front plate 64 and intermediate plate 68 are stiffeners 72. Under some circumstances, an adjustable air type shock absorber might be able to be used instead of the air bags 54.

The forward connection 56 of the air bag suspension unit 50 is comprised of a mounting bracket 74 having apertures 76 therein. The mounting bracket 74 is designed to receive a forward frame mount 78 (FIGS. 2 and 7) projecting from the motorcycle main frame 14. The forward frame mount 78 is adapted to receive a second threaded bolt 80 which extends through the apertures 76 in the forward connection 56 and through the forward mount 78. A nut 82 secures the forward connection 56 to the motorcycle main frame 14.

Figure 3:
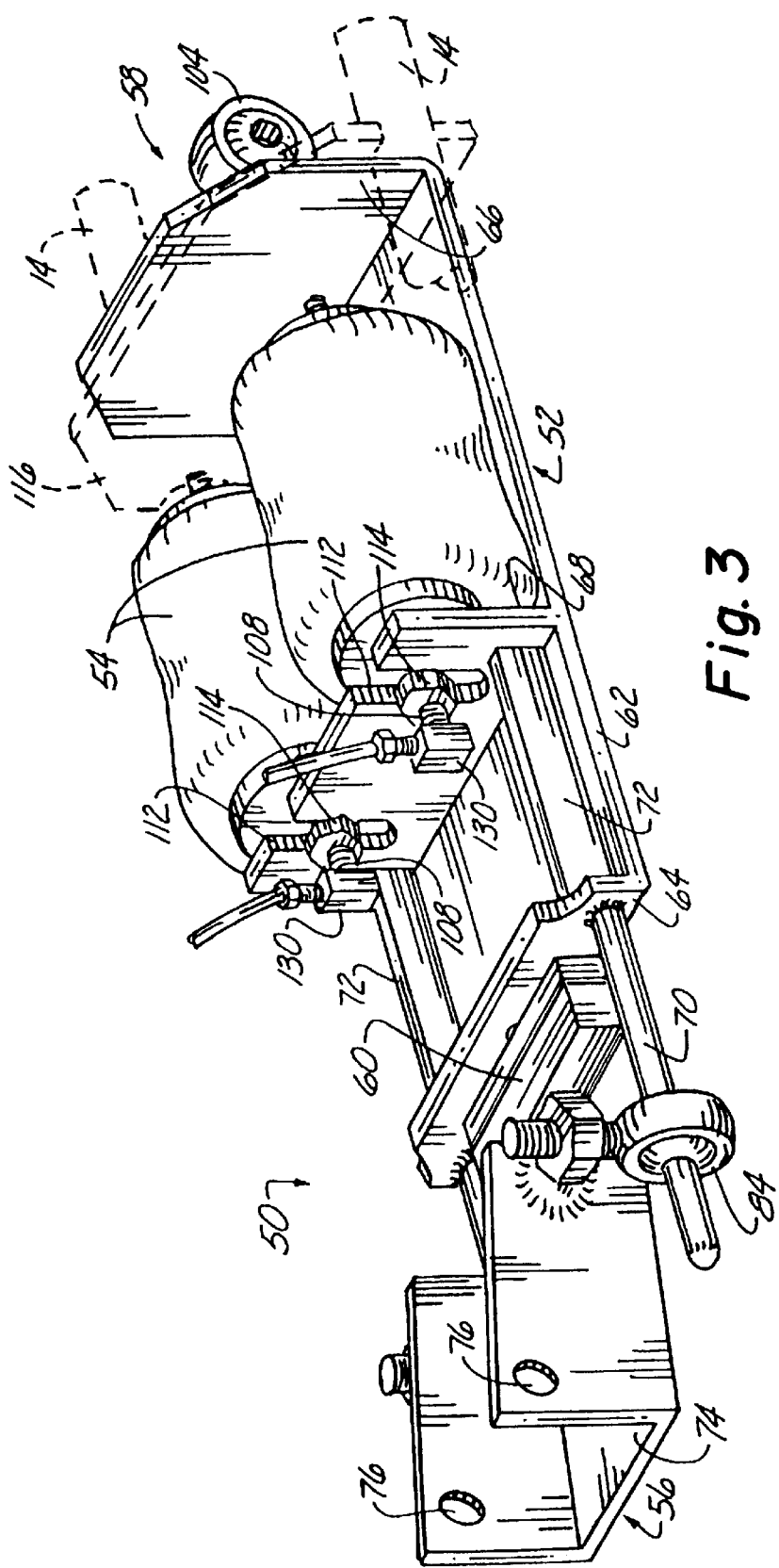
FIG. 3 illustrates a detailed perspective view of the air bag suspension unit of the present invention.
Figure 4:
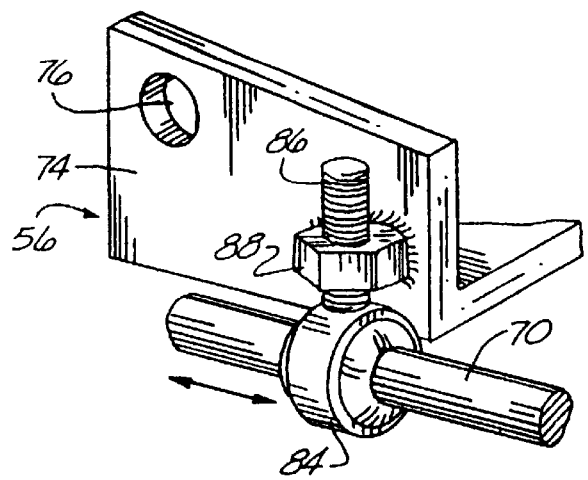
FIG. 4 illustrates a detailed perspective view of the front connection of the air bag suspension unit of the present invention.

As shown in FIGS. 3 and 4, the forward connection 56 also includes a first pair of bushings 84 which receive the slide rods 70 (the purpose of which will be discussed later). In the preferred embodiment, the bushings 84 include a threaded connector 86 which threadably engages a receiving nut 88 fixed to the mounting bracket 74. The threaded connection enables the bushing 84 to be adjusted so that the slide rods 70 are substantially parallel with the bottom of the motorcycle main frame 14.

Figure 5:
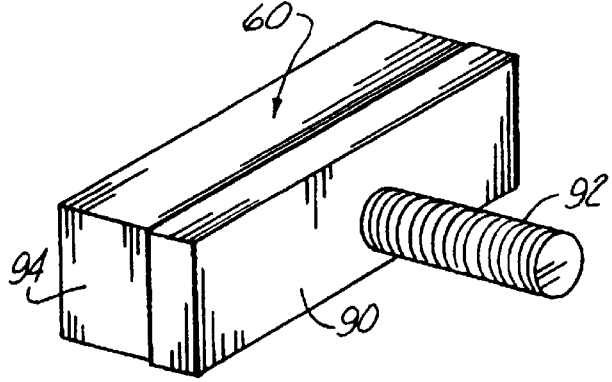
FIG. 5 illustrates a perspective view of the stop member.
Figure 7:
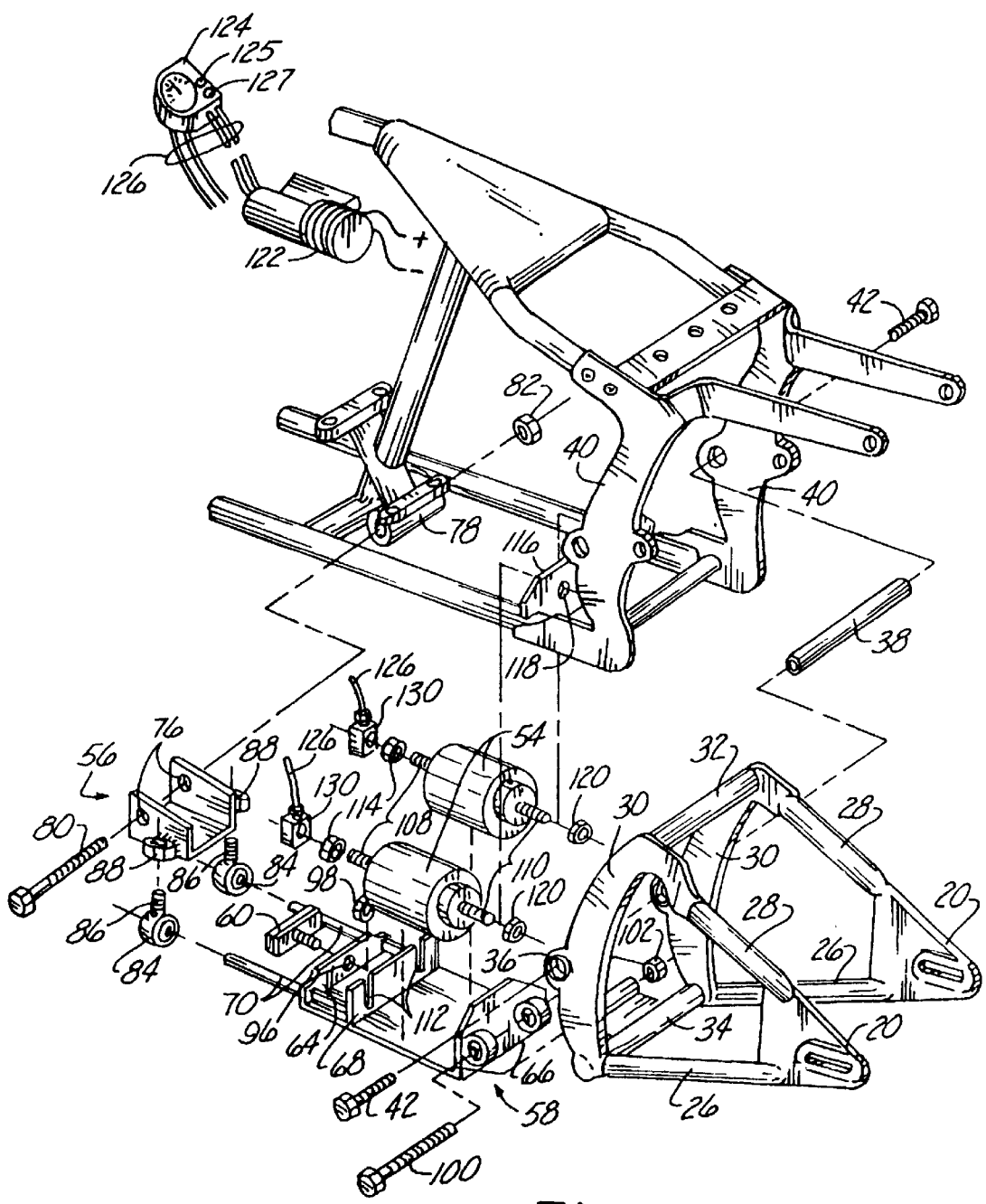
FIG. 7 illustrates an exploded perspective view of the components comprising the air bag suspension system of the present invention.

The resilient stop member 60 is disposed between the front plate 64 of the slidable housing 52 and the forward connection 56, and fits between the slide rods 70 (FIGS. 3 and 7). The resilient stop member 60 is comprised of a plate 90 (FIG. 5) having a threaded stud 92 fixed to one face. Fixed to the opposing face of the plate 90 is received by an aperture 96 (FIG. 7) in the front plate 64 and is secured thereto by a nut 98. The resilient stop member 60 acts as a stop to prevent the front plate 64 of the slidable housing 52 from coming into contact with the forward connection 56 as the slidable housing 52 moves forwardly. The movement of the slidable housing 52 is discussed in detail below, and the purpose of the stop member 60 will then be appreciated.

Figure 6:
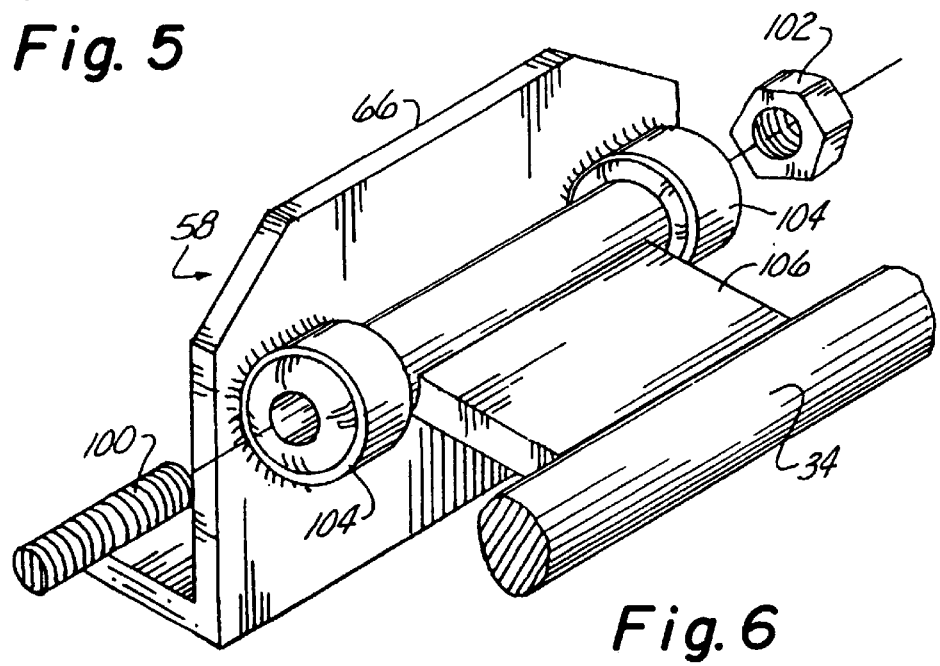
FIG. 6 illustrates a detailed perspective view of the rear connection of the air bag suspension unit of the present invention.

The rearward connection 58 is connected to the swing arm 16 by a third threaded bolt 100 and nut 102 (FIGS. 6 and 7). The rearward connection 58 is comprised of a second pair of bushings 104 connected to the rear plate 66 of the slidable housing 52. The second pair of bushings 104 are spaced apart to receive a swing arm mount 106 projecting from the lower transverse cross member 34 of the swing arm 16. The swing arm mount 106 is adapted to receive the third threaded bolt 100 and to fit between the spaced apart pair of second bushings 104. The third threaded bolt 100 extends through the bushings 104 and swing arm mount 106 and threadably engages the nut 102, thereby pivotally securing the air bag housing 52 to the swing arm 16.

Disposed within the housing 52 between the intermediate plate 68 and the rear plate 66 are preferably two air bags 54 constructed out of an elastomeric material. The air bags 54 and the slidable housing 52 take the place of the shock absorbers in the standard or stock SOFTAIL® suspension system. The two air bags 52 are of the type manufactured by Firestone, (model number 1M1A1, or an equivalent thereof), having threaded nipples 108 at their forward ends and threaded connectors 110 at their rearward ends (FIG. 7). The air bags are designed for a gauge pressure between 0 psi and 115 psi minimum. Slots 112 (FIGS. 3 and 7) in the intermediate plate 68 receive the threaded nipples 108 projecting from the forward end of the air bags 54. A nut 114 secures the forward ends of the air bags 54 to the intermediate plate 68. The rearward ends of the air bags 54 are secured to a mounting bracket 116 (FIGS. 2 and 7) on the motorcycle main frame 14. When the air bag suspension unit 50 is in the proper mounting position, the mounting bracket 116 will be disposed between the intermediate plate 68 and the rear plat 66 as illustrated in FIG. 3. The air bags 54 fit between the intermediate plate 68 and the mounting brackets 116. The mounting brackets 116 include apertures 118 (FIGS. 2 and 7) adapted to receive the threaded connectors 110 at the rearward ends of the air bags 54. Nuts 120 (FIG. 7) threadably engage the connectors 110 on the motorcycle main frame 14.

In the preferred embodiment, the air bags 54 are connected to a small air compressor 122 (FIGS. 8 and 9) by air lines 126. A gauge 124 operably connected to the air lines enables the rider to see the amount of pressure in the system. The pressure gauge 124 and compressor 122 may be mounted on brackets projecting from the frame 14. It is desirable to place the gauge 124 in a position where it will be visible to the rider, and easily accessible, for example, near the gas tank, speedometer, tachometer, etc. Two buttons 125, 127 are located near the gauge 124. The first button 125, acts to engage a dump valve for deflating the air bags 54. The second button 127 engages the compressor to inflate the air bags 54. The compressor 122 and control buttons 125 and 127 are connected through the motorcycles electrical system which receives electrical current from the motorcycle battery 128. The air lines 126 run between the air compressor 122 and gauge 124 and are connected to the threaded nipples 108 at the forward end of the air bags 54 by a fitting 130 (FIG. 7).

Figure 10:
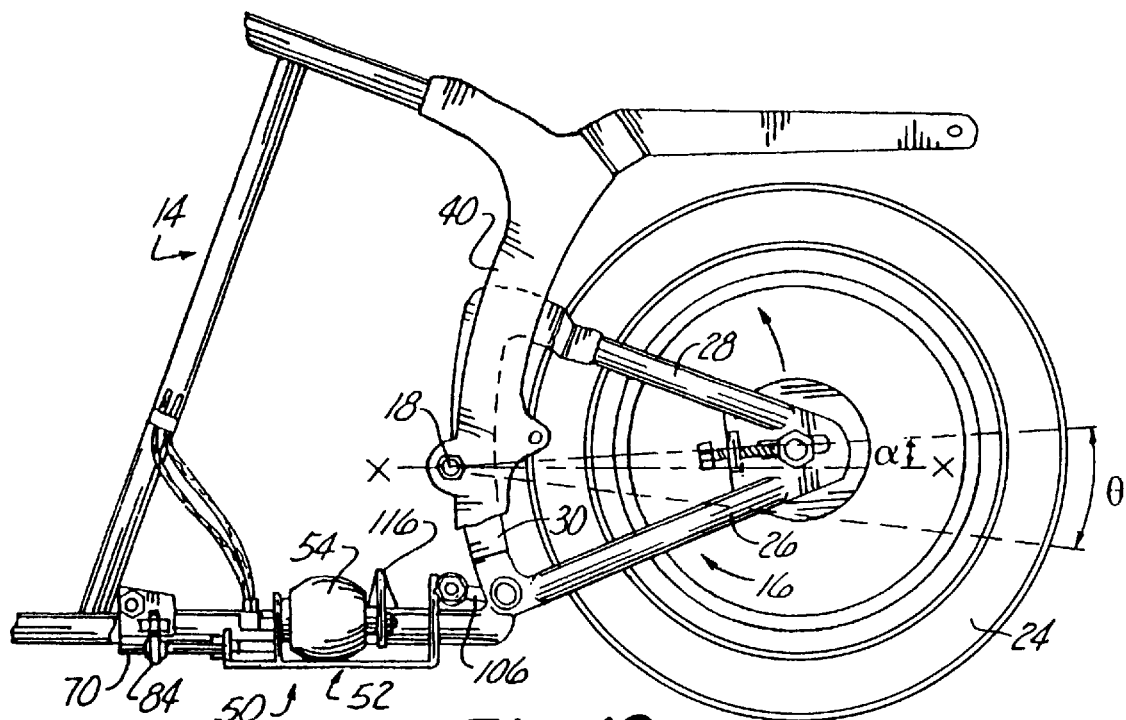
FIGS. 10 and 11 illustrate elevation views of the rear portion of a motorcycle showing the pivoting action of the swing arm and deflection of the air bags.
Figure 11:
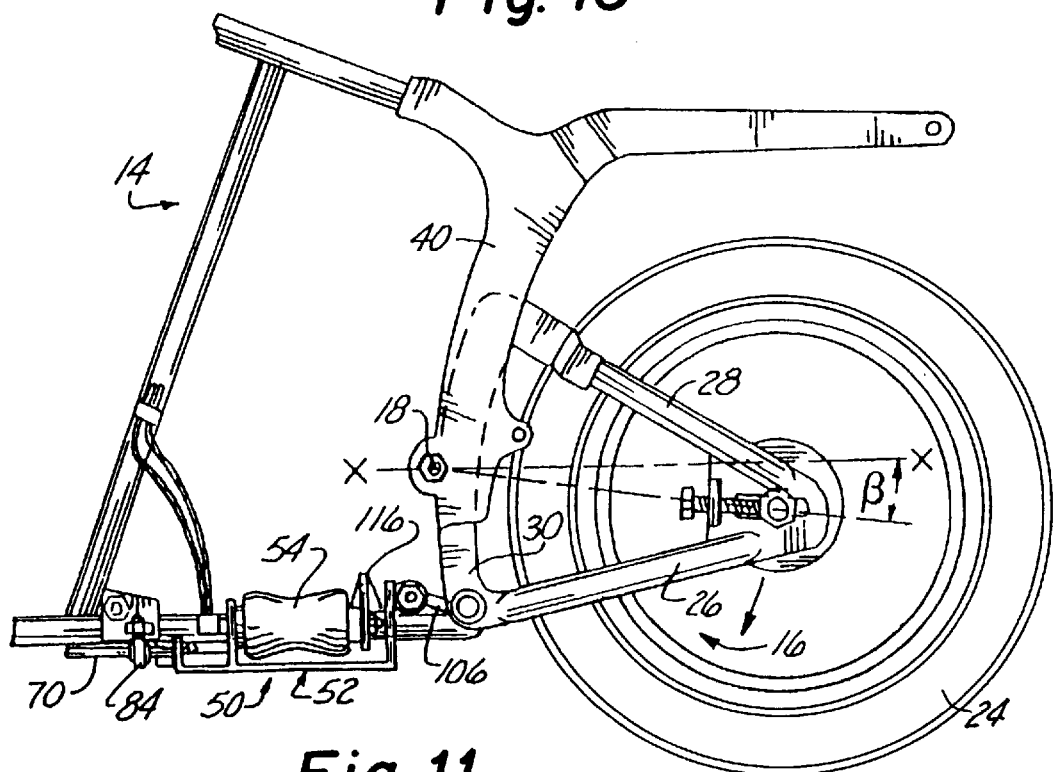

FIGS. 10 and 11 illustrate the air bag suspension system 10 of the present invention in operation. It should be understood that the swing arm 16 operably connects the rear wheel 24 to the motorcycle main frame 14 at the pivot axis 18. With the rear wheel 24 pivotally connected to the motorcycle main frame 14, the rear wheel 24 is free to arcuately move independently of the frame about the pivot axis 18 through an angle Θ (FIG. 10). As the rear wheel 24 arcuately moves through the angle Θ the air bag 54 is caused t compress (FIG. 10) or stretch (FIG. 11) thus dampening the effect of the action of the wheel 24 much like the shock absorbers in the stock SOFTAIL® suspension system, only more effectively.

The use of air bags 54 has several advantages over the shock absorbers. For example, the air pressure in the air bags 54 can be adjusted while the motorcycle is on the move. If the air pressure within the air bag 54 is increased, the ride will be stiffer. If the air pressure within the air bag 54 is decreased, the ride will be softer. Also, the responsiveness of the air bags 54 to rapid changes in wheel direction is much better than the responsiveness of shock absorbers. As discussed previously, shock absorbers have inherent friction and drag problems which reduces the responsiveness of the piston and shaft within the shock absorber to rapid directional changes. Because the air bags 54 do not have a shaft and piston arrangement, there is no inherent drag or friction and therefor the responsiveness of the air bags to rapid directional changes is much quicker. Additionally, for appearance purposes, the air bag 54 can be fully inflated causing the rear of the motorcycle to set higher than the forward portion of the motorcycle. Alternatively, for the opposite appearance, the air in the air bags can be completely released thus lowering the rear of the motorcycle. The ability to vary the height of the rear end is desirable to many motorcycle enthusiasts particularly when displaying their motorcycles at rallies or bike shows.

In operation, if the rear wheel 24 is caused to move upwardly above an axis x—x (FIG. 10), the rearward end of the swing arm 16 will also move arcuately upwardly through an angle α Because the swing arm 16 is pivotal about the pivot axis 18, the upward movement of the rearward end of the swing arm 16 will cause the forward end of the swing arm 16 to move arcuately downwardly. The downward and rearward movement of the lower transverse cross member 34 of the swing arm 16 will pull the air bag housing 52 rearwardly; the air bag housing 52 being pivotally connected at its rearward connection 58 to the lower transverse cross member 34 of the swing arm 16 by the swing arm mount 106. As the air bag housing 52 is drawn rearwardly, the slide rods 70 slide rearwardly through the bushings 84. The rearward movement of the air bag housing 52 relative to the stationary mounting bracket 116 on the motorcycle main frame 14 causes the air bag 54 therebetween to compress (FIG. 10) thus dampening the effect of the movement of the rear wheel 24.

If the rear wheel 24 is caused to move downwardly below an axis x—x (FIG. 11), the rearward end of the swing arm 16 will also move arcuately downwardly through an angle β. Because the swing arm 16 is pivotal about the pivot axis 18, the downward movement of the rearward end of the swing arm 16 will cause the forward end of the swing arm 16 to move arcuately upwardly. The upward and forward movement of the lower transverse cross member 34 of the swing arm 16 will push the air bag housing 52 forwardly. As the air bag housing 52 is pushed forwardly, the slide rods 70 slide forwardly through the bushings 84. The forward movement of the air bag housing 52 relative to the stationary mounting bracket 116 of the motorcycle main frame 14 causes the air bag 54 therebetween to stretch (FIG. 11) thus dampening the effect of the movement of the rear wheel 24.

It should be appreciated that the above described air bag suspension system 10 is extremely responsive thereby giving the rider a very smooth ride. It should be appreciated however, that because of the extremely responsive nature of the air bags 58, the above described suspension system 10 is best suited for highway travel where the traveling surface is relatively smooth and also in situations where the rider wants to display his or her motorcycle at rallies and bike shows. It has been determined that if the motorcycle, using the above described air bag suspension system, is used on rough terrain, a slight modification of the above described suspension system 10 is preferred.

Figure 12:
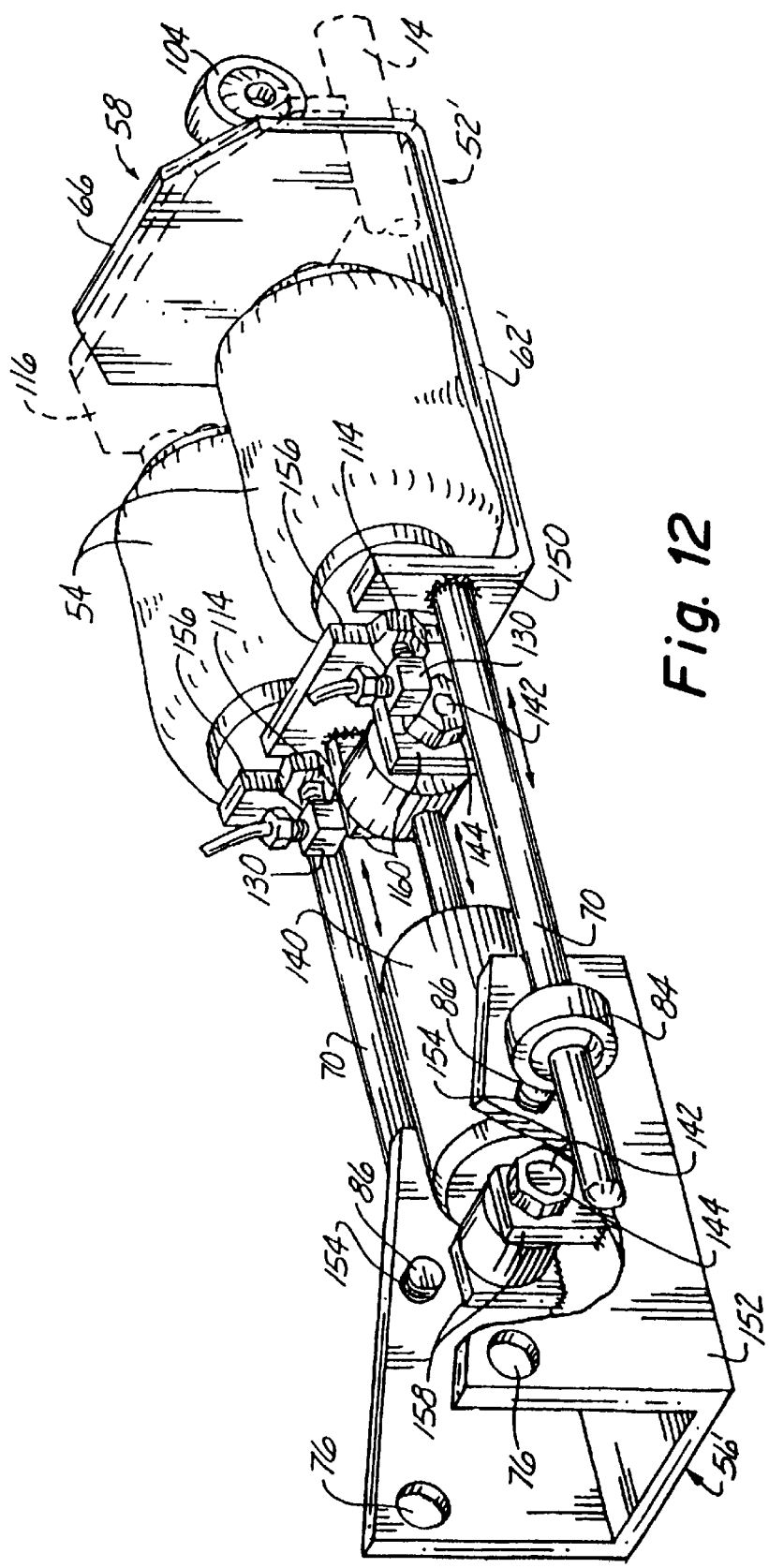
FIG. 12 is a perspective view of an alternative embodiment of the air bag suspension unit.

This alternative embodiment is shown in FIG. 12 and includes a modified air bag suspension unit 50'. In this embodiment, the air bag suspension unit 50' includes a slidable housing 52', which preferably includes the same two air bags 54, a forward connection 56' slightly modified as compared to the first embodiment, the same rearward connection 58, and a shock absorber 140. The slidable housing 52' is comprised of a bottom plate 62', to which is attached a front plate 150 and a rear plate 66. Attached to the front plate 150 are slide rods 70.

The forward connection 56' of the air bag suspension unit 50' is substantially the same as that described for the first embodiment. The forward connection 56' is comprised of a mounting bracket 152 having apertures 154 therein. The mounting bracket 152 is designed to receive a forward frame mount 78 (FIGS. 2 and 7) projecting from the motorcycle main frame 14. The forward frame mount 78 is adapted to receive a threaded bolt 80 which extends through the apertures 154 in the forward connection 56' to the motorcycle main frame 14.

As shown in FIG. 12, the forward connection 56' also includes a pair of bushings 84 which receive the slide rods 70. In this embodiment, the bushings 84 include a threaded connector 86 which threadably engages a second aperture 154 tapped to receiving the threads of the threaded connector 86.

The rearward connection 58 is the same as that of the first embodiment shown in FIG. 6. The rearward connection 58 is comprised of a pair of bushings 104 connected to the rear plate 66 of the slidable housing 52'. The pair of bushings 104 are spaced apart to receive the swing arm mount 106 projecting from the lower transverse cross member 34 of the swing arm 16. The swing arm mount 106 is adapted to receive the threaded bolt 100 and to fit between the spaced apart pair of second bushings 104. The threaded bolt 100 extends through the bushings 104 and swing arm mount 106 and threadably engages the nut 102, thereby pivotally securing the air bag housing 52 to the swing arm 16.

Disposed within the housing 52' between the first plate 150 and the rear plate 66 are preferably two air bags 54 constructed out of an elastomeric material. The two air bags 52 are of the type manufactured by Firestone, (model number 1M1A1, or an equivalent thereof), having threaded nipples 108 at their forward ends and threaded connectors 110 at their rearward ends (FIG. 7). The air bags are designed for a gauge pressure between 0 psi and 115 psi minimum. Slots 156 (FIG. 12) in the front plate 150 receive the threaded nipples 108 projecting from the forward end of the air bags 54. A nut 114 secures the forward ends of the air bags 54 to the front plate 150. The rearward ends of the air bags 54 are secured to a mounting bracket 116 on the motorcycle main frame 14. When the air bag suspension unit 50' is in the proper mounting position, the mounting bracket 116 will be disposed between the front plate 150 and the mounting brackets 116. The mounting brackets 116 include apertures 118 (FIGS. 2 and 7) adapted to receive the threaded connectors 110 at the rearward ends of the air bags 54. Nuts 120 (FIG. 7) threadably engage the connectors 110 thereby securing the rearward ends of the air bags 54 to the mounting brackets 116 on the motorcycle main frame 14.

The shock absorber 140 is disposed between the forward connection 56' and the front plate 150 of the slidable housing 52' and is pivotally attached at both ends thereto as illustrated in FIG. 12. It should be appreciated that the forward connection 56' includes a connecting bracket 158 and the front plate 50 includes a connecting bracket 160 adapted for receiving the respective mounting ends of the shock absorber 140. A threaded connector 142 and nut 144 pivotally connect the shock absorber 140 to the connecting brackets 158 and 160.

With this modified air bag suspension unit 50', all the advantages and features outlined and described for the first embodiment are possible with the added feature of a conventional shock absorber to improve the handling of the motorcycle on rough or uneven terrain.

Figure 13:
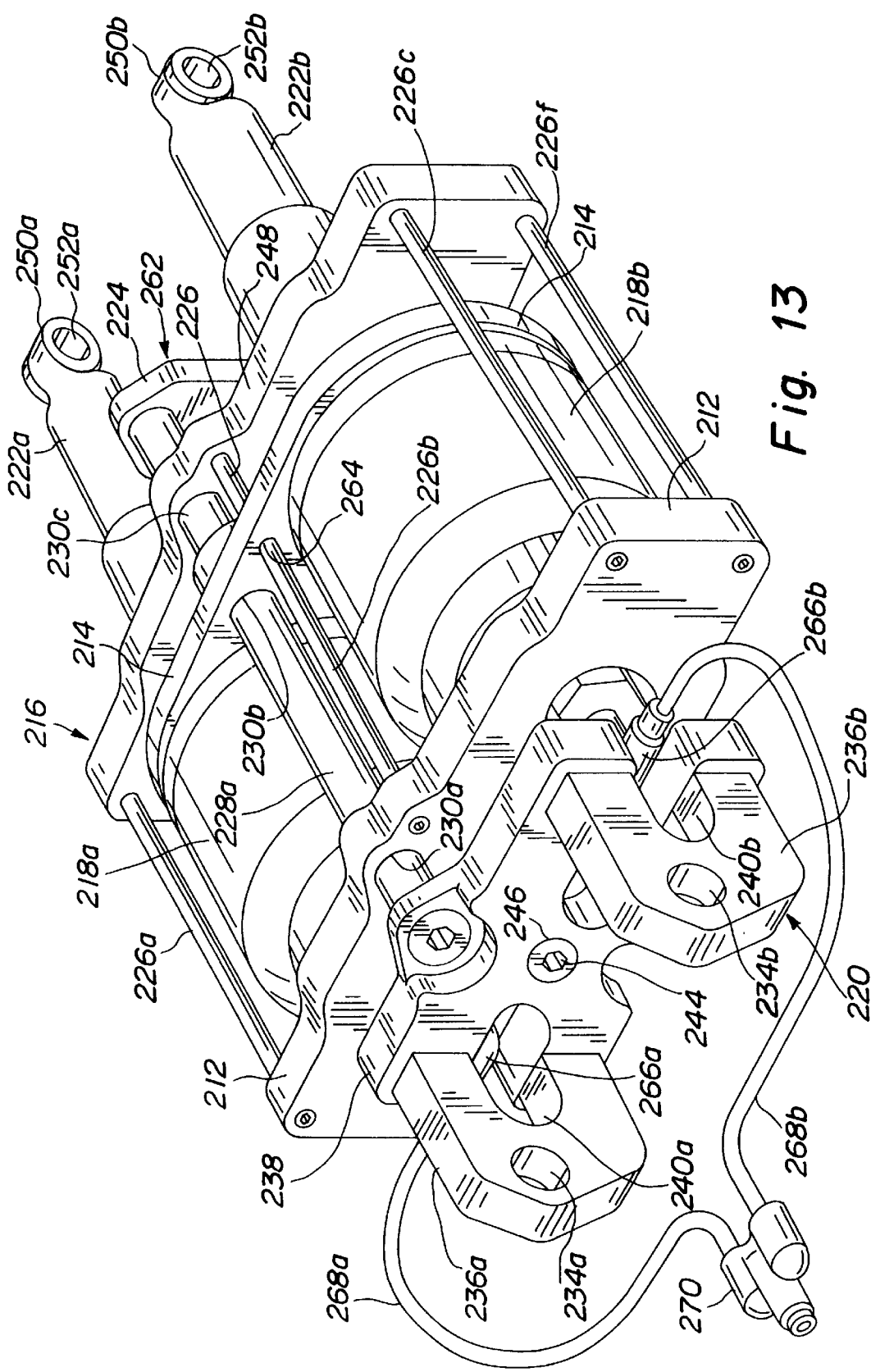
FIG. 13 illustrates a perspective view of a second alternative embodiment of the air bag suspension system.
Figure 14:
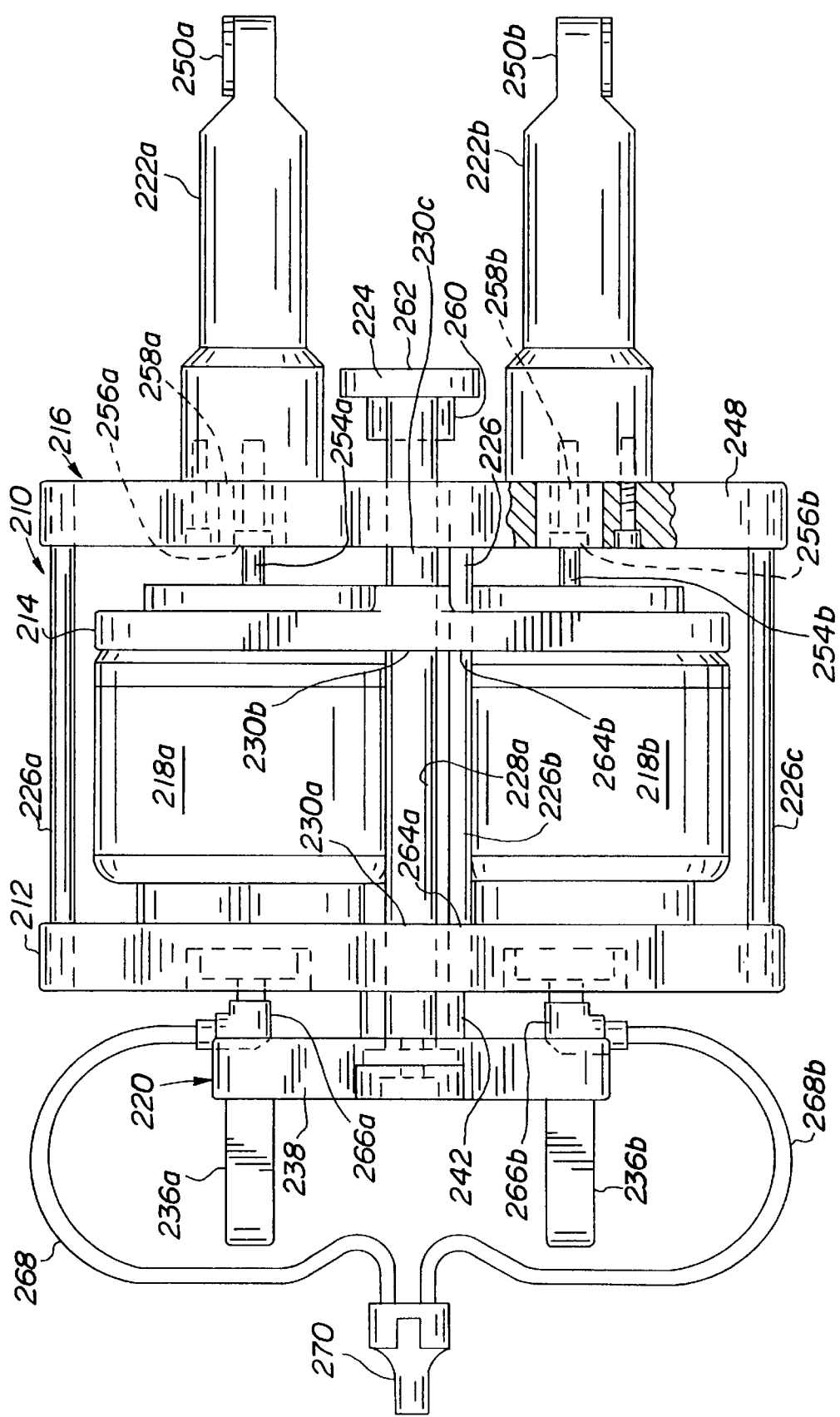
FIG. 14 illustrates a top view of the second alternative embodiment.
Figure 15:
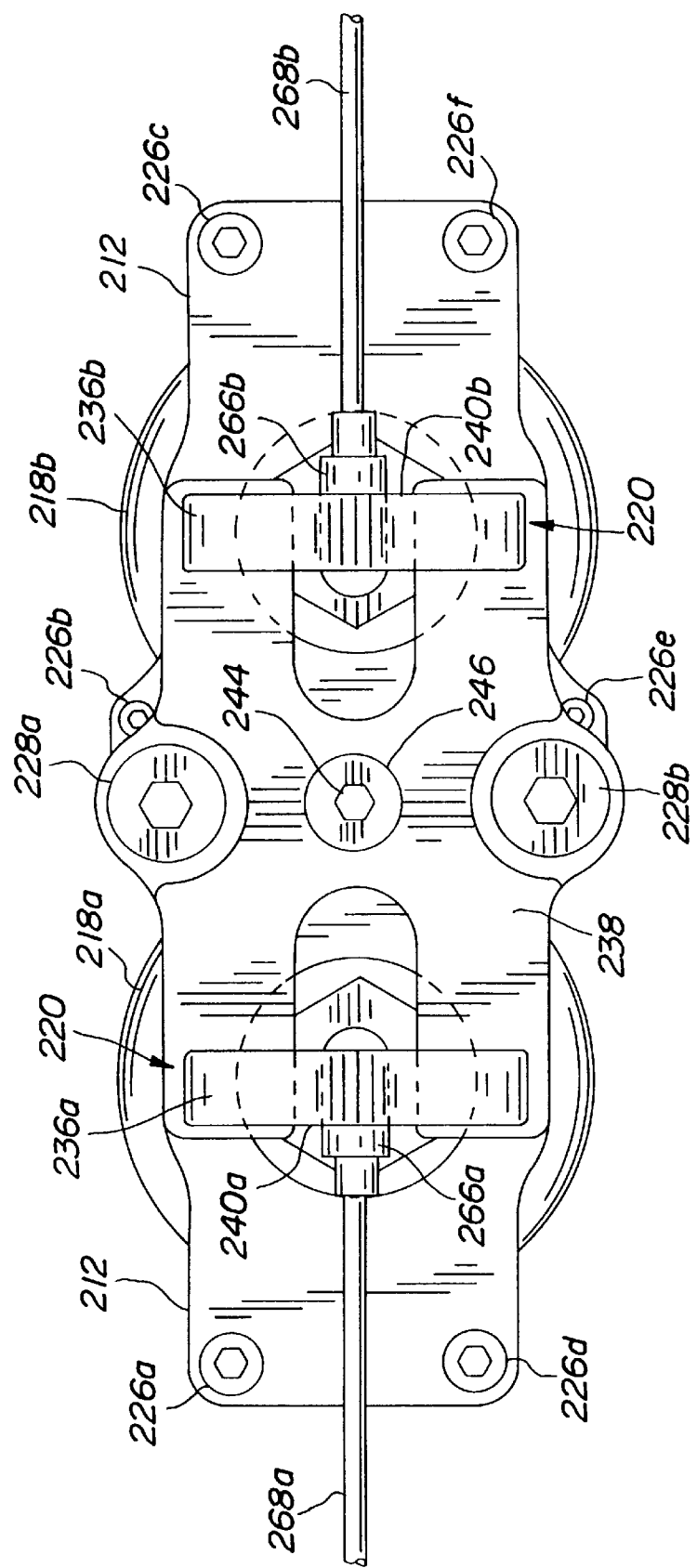
FIG. 15 illustrates an end view of the second alternative embodiment.

FIG. 13 illustrates a perspective view of a second alternative embodiment of the air bag suspension unit 210, which is used in a similar fashion as the previous embodiments for the same purposes. For further reference, FIG. 14 illustrates a top view of the second alternative embodiment. It is understood that both the top view and the bottom view of the air bag suspension unit 210 are identical. Also illustrated for further reference is FIG. 15 which is an end view of the second alternative embodiment. The air bag suspension unit 210 is comprised of a front plate 212, an intermediate plate 214, a rear plate 216, preferably two air bags 218a–218b disposed between the front plate 212 and the intermediate plate 214 and a stop plate 224. The front plate 212 and the rear plate 216 are rigidly interconnected by preferably six spacer rods 226a–226f secured thereto as illustrated. The front mounting bracket 220 is connected to the stop plate 224 by two slide rods 228a–228b which slidingly engage apertures 230a–230c in the front, intermediate and rear plates 212, 214 and 216, respectively.

The front mounting bracket 220 of the air bag suspension unit 210 incorporates two mounting plates 236a–236b, having apertures 234a and 234b, which are aligned in a parallel fashion and perpendicularly fixed to a mounting plate 238. There are also provided cut-outs 240a–240b which extend horizontally on the mounting plates 236a–236b and continue inwardly toward the center on the base plate 238 to provide space for fittings 266a–266b, later described, throughout the entire range of motion. The front mounting bracket 220 designed to receive a forward frame mount 78 projecting from the motorcycle main frame 14, FIGS. 2 and 7. The front mounting bracket 220 is adapted to receive two bolts 80 which extends through apertures 234a–234b of mounting plates 236a–236b and through the internally threaded forward frame mount 78 where bolts 80 secure the front mounting plate 220 to the motorcycle main frame 14 providing the pivotal engagement previously described. FIG. 7 illustrates a bolt 80 and a nut 82 which could also be used. The opposing side of base plate 238 incorporates a centrally located resilient stop 242 disposed between the front mounting bracket 220 and the front plate 212 and is secured to base plate 238 by a bolt 244 which passes through an aperture 246 in the base plate 238, resilient stop 242 and is secured with a washer and nut, not illustrated. The resilient stop 242 is simply an adaptation of a common doorknob bumper comprised entirely of polyurethane or like material. The resilient stop 242 acts as a stop to prevent the front plate 212 from coming into contact with the base plate 238 of front mounting bracket 220 as the front plate 212 travels forward an also limits the travel of the rear wheel 24.

The rear plate 216 is comprised of a base plate 248 having two parallel hydraulic dampening arms 222a–222b aligned in a extending outward perpendicular to rear plate 216. At the outward end of each hydraulic mounting arm 222a–222b are rearward ends 250a–250b, each containing an aperture 252a–252b. The rearward ends 250a–250b are connected to the swing arm 16 by two bolts 100 which pass through the apertures 252a–252b and secure to the internally threaded swing arm mount 106. FIGS. 6 and 7 illustrate a nut 102 and bolt 100 which may also be used for the same purpose. This configuration provides the same pivotal engagement between the swing arm 16 and the hydraulic dampening arms 222a–222b. The inward ends 258a–258b of the hydraulic dampening arms 222a–222b extend through apertures 256a–256b of rear plate 216 where hydraulic rods 254a–254b further extend and secure to intermediate plate 214. The purpose of the hydraulics is to provide dampening which assists in eliminating wheel hop and adds to the overall control and comfort of the motorcycle while in operation. The hydraulic dampening arms 222a–222b incorporate internal pistons, but a self adjusting dampening system may be used which incorporates an air canister reservoir, illustrated in FIG. 16, which is spliced into the air hose 276 between the pneumatic connector 270 and the gauge 124. The air canister reservoir 274 self-adjusts when pressure is added or released by the compressor 122. This is further described in FIG. 16.

Stop plate 224 is comprised of a perpendicularly-oriented plate with a centrally located resilient stop 260 on the forward side. The resilient stop 260 is disposed between the rear plate 216 and the stop plate 224 and is secured to stop plate 224 by a bolt 262 which passes through an aperture in stop plate 224, and is secured with a washer and nut, not illustrated. The resilient stop 260 acts as a stop to prevent the rear plate 216 from coming into contact with the stop plate 224 as the rear plate 216 travels rearward and limits wheel travel. The stop plate 224 is horizontally aligned with reference to hydraulic dampening arms 222a–222b. Slide rods 228a–228b are also secured to the inward side of the stop plate 224.

The intermediate plate 214 is disposed between front plate 212 and rear plate 216 and is secured to slide rods 228a–228b, but is not secured to spacer rods 226a–226f. The centrally located spacer rods 226a–226f slidingly engage aperture 264. Disposed between the front plate 212 and the intermediate plate 214 are preferable two air bags 218a–218b, similar to those previously described, having threaded nipples on the forward ends and threaded connectors on their rearward ends, not illustrated. The forward ends of air bags 218a–218b are secured to the rearward side of front plate 212 as described previously, but the rearward ends of the air bags 218a–218b are secured to the forward side of intermediate plate 214. The threaded nipples receive fittings 266a–266b having air hoses 268a–268b which lead into a pneumatic connector 270 which manifolds the two air hoses 268a–268b to a one line output which is connected to the compressor and gauge previously described. The threaded connectors are coupled with hydraulic rods 254a–254b on the rearward side of intermediate plate 214.

Figure 16:
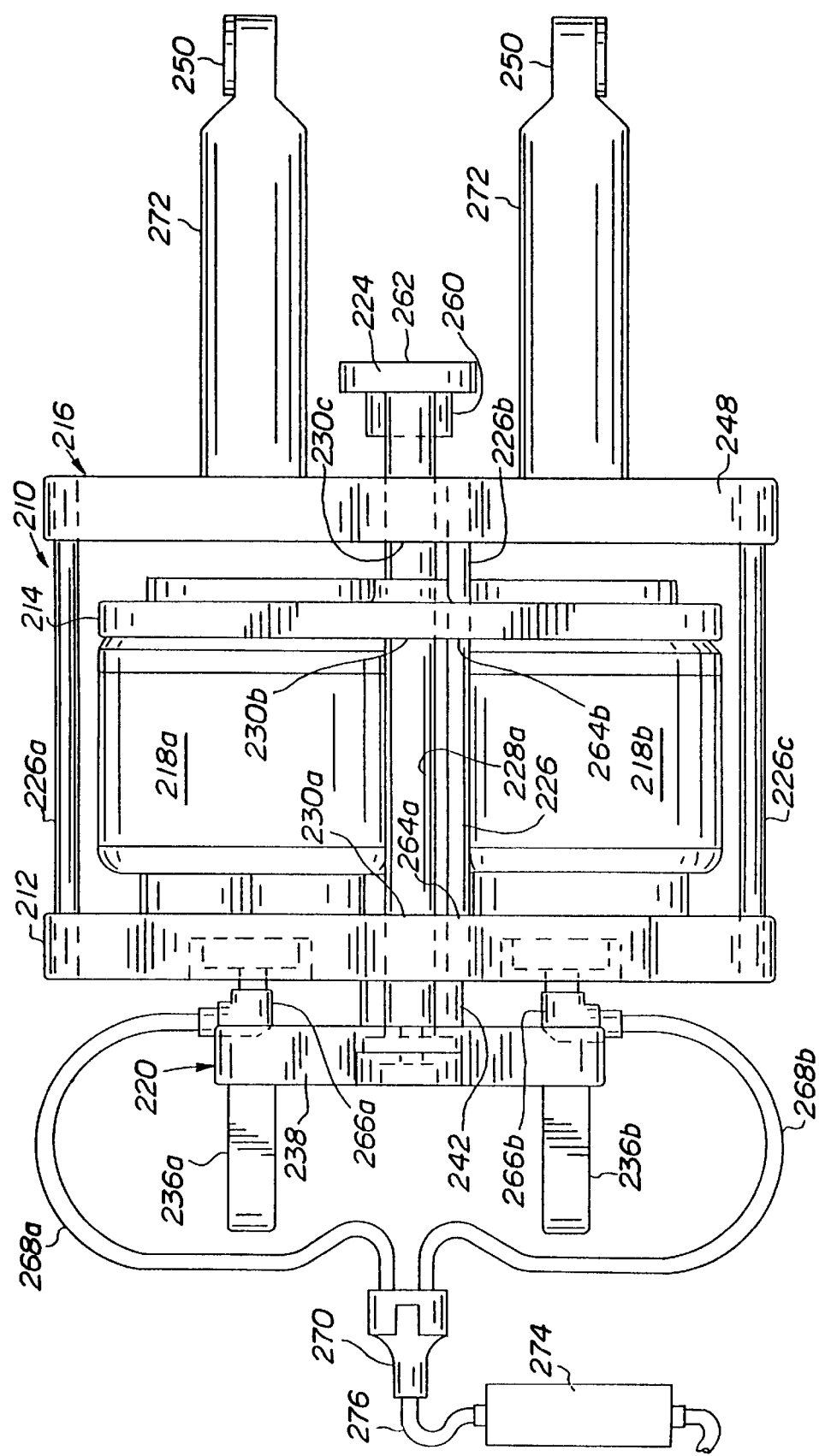
FIG. 16 illustrates a top view of a third alternative embodiment.

FIG. 16 illustrates a top view of the third alternative embodiment, where all numerals correspond to those elements previous or otherwise described. Illustrated in particular is a reservoir canister 274 and mounting arms 272a–272b. The mounting arms 272a–272b replace the hydraulic damping arms 222a–222b of the previous alternative embodiment and act solely as mounting arms which secure to the swing arm 16. The hydraulic rods 254a–254b have also been completely removed from the air bag suspension unit 210. In order to recreate the damping previously provided by the hydraulics, there is incorporated an air reservoir canister 274 which is spliced into the air hose 276 between pneumatic connector 270 and gauge 124. The purpose of the air reservoir canister 274 is similar to that of the hydraulic damping arms 222a–222b in that the air reservoir canister 274 dampens the air bag suspension unit 210 when in use and acts as a shock absorber. When the motorcycle hits a bump or pothole, air travels out of air bags 218a–218b through air hoses 268a–268b and pneumatic connector 270 and into the air reservoir canister 274. Once the swing arm 16 recovers from the bumps, the air in the air reservoir canister 274 returns to the air bags 218a–218b following the same path in reverse order. The air reservoir canister 274 replaces the hydraulics and improves upon them because it is a self-adjusting damping system. The air reservoir canister 274 is mounted directly to the motorcycle main frame 14 in an unobtrusive location.

Mode of Operation

This alternative embodiment provides an air bag suspension unit 210, which incorporates its own set of stops, eliminates the need for using the mounting brackets 116 as a stop as described in the preferred embodiment. The hydraulics dampen the travel of the air bag suspension unit 210 by providing forward pressure against the intermediate plate 214 when the air is released from the air bags. Spacer rods 226a–226f and guide rods 228a–228b provide guidance to the air bags 218a–218b along their path of travel when the air bags 218a–218b are inflated and deflated. An optional pressure regulator may be added to limit air pressure in the air bags 218a–218b, although the present invention incorporates an air compressor 122 which cannot exceed the capacity limits of the air bags 218a–218b. If a higher capacity air compressor is used, the pressure regulator would be necessary.

After properly mounting the air bag suspension unit 210, an appropriately sized cover plate may be mounted directly to the underside of front plate 212 and the rear plate 216 of the air bag suspension system 210, or may be directly mounted to the motorcycle frame itself. This cover plate will prevent debris from interfering with the operation of the air bag suspension unit 210 and will prevent damage if the motorcycle bottoms out.

Various modifications can be made to the present invention without departing from the apparent scope hereof.

PARTS LIST

| | |
|---|---|
| 10 | air bag suspension system |
| 12 | motorcycle |
| 14 | main frame |
| 16 | swing arm |
| 18 | pivot axis |
| 20 | wheel mounts |
| 22 | rear wheel axis |
| 24 | rear wheel |
| 26 | arm |
| 28 | arm |
| 30 | connectors |
| 32 | upper transverse cross member |
| 34 | lower transverse cross member |
| 36 | bearings |
| 38 | intermediate transverse cross member |
| 40 | frame struts |
| 42 | set of bolts |
| 44 | apertures |
| 50 | air bag suspension unit |
| 52 | slidable housing |
| 54 | air bags |
| 56 | forward connection |
| 58 | rearward connection |
| 60 | stop member |
| 62 | bottom plate |
| 64 | front plate |
| 66 | rear plate |
| 68 | intermediate plate |
| 70 | slide rods |
| 72 | stiffeners |
| 74 | mounting bracket |
| 76 | apertures |
| 78 | forward frame mount |
| 80 | second threaded bolt |
| 82 | nut |

-continued

PARTS LIST

| | |
|---|---|
| 84 | bushings |
| 86 | threaded connector |
| 88 | nut |
| 90 | plate |
| 92 | threaded stud |
| 96 | aperture |
| 98 | nut |
| 100 | third threaded bolt |
| 102 | nut |
| 104 | bushings |
| 106 | swing arm mount |
| 108 | threaded nipples |
| 110 | threaded connectors |
| 112 | slots |
| 114 | nut |
| 116 | mounting bracket |
| 118 | apertures |
| 120 | nuts |
| 122 | small air compressor |
| 124 | gauge |
| 125 | buttons |
| 126 | air lines |
| 127 | buttons |
| 128 | motorcycle battery |
| 130 | fitting |
| 140 | shock absorber |
| 142 | threaded connector |
| 144 | nut |
| 150 | front plate |
| 152 | mounting bracket |
| 154 | apertures |
| 156 | slots |
| 158 | connecting bracket |
| 160 | connecting bracket |
| 210 | air bag suspension unit |
| 212 | front plate |
| 214 | intermediate plate |
| 216 | rear plate |
| 218a-b | air bags |
| 220 | front mounting bracket |
| 222a-b | hydraulic dampening arms |
| 224 | stop plate |
| 226a-f | spacer rods |
| 228a-b | slide rods |
| 230a-c | aperture |
| 234a-b | aperture |
| 236a-b | mounting plates |
| 238 | base plate |
| 240a-b | cut-outs |
| 242 | resilient stop |
| 244 | bolt |
| 246 | aperture |
| 248 | base plate |
| 250a-b | rearward ends |
| 252a-b | aperture |
| 254a-b | hydraulic rods |
| 256a-b | aperture |
| 258a-b | inward ends |
| 260 | resilient stop |
| 262 | bolt |
| 264 | aperture |
| 266a-b | fittings |
| 268a-b | air hoses |
| 270 | pneumatic connector |

-continued

PARTS LIST

| | |
|---|---|
| 272a-b | mounting arms |
| 274 | air reservoir canister |
| 276 | air hose |

What is claimed is:

1. An air bag system for a motorcycle having a main frame and a swing arm mounted rear wheel, the air bag system comprising:
   a. a front plate, having a pair of apertures;
   b. a rear plate, rigidly interconnected to the front plate, and having a pair of apertures, and a rearwardly extending hydraulically dampened rear mount attachable to the swing arm;
   c. an intermediate plate, between the front and rear plates, the intermediate plate having a pair of apertures;
   d. at least one air bag of elastomeric material disposed between and connected to the front plate and the intermediate plate;
   e. a stop plate;
   f. a pair of slide rods, extending forwardly from the stop plate, connecting to the intermediate plate and slidingly engaging the apertures of the front, and rear plates;
   g. a front mounting bracket, the front mounting bracket adapted for pivotal attachment to a motorcycle mainframe and attached to the slide rods;
   h. an air compressor supplying compressed air to the at least one air bag, and,
   i. means to regulate the supplied air from the compressor to enable adjustment of the swing arm position.

2. The air bag system of claim 1, wherein the means to regulate the supplied air include a bleed valve.

3. The air bag system of claim 1, wherein the means to regulate the supplied air include an air pressure regulator.

4. The air bag system of claim 1, wherein the at least one air bag is two air bags.

5. The air bag system of claim 4, wherein the two air bags are connected to the air compressor by two air hoses manifold connected to a single air hose from the air compressor.

6. The air bag system of claim 5, further comprising an air reservoir canister in communication with the single air hose.

7. An adjustable air suspension system for a motorcycle having a main frame and a rear wheel carried by a swing arm, the adjustable air suspension system comprising:
   a. a first assembly, including:
      (1) a mounting plate pivotably attachable to the main frame;
      (2) an intermediate plate; and,
      (3) a stop plate;
      wherein the intermediate plate and the stop plate rigidly connect to and are spaced apart from the mounting plate and each other by a slide rod;
   b. a second assembly pivotably attachable to the swing arm and slidably movable relative to the first assembly, the second assembly including:
      (1) a front plate having at least one aperture; and,
      (2) a rear plate having at least one aperture, the rear plate rigidly spaced apart from the front plate;
      wherein the slide rod of the first assembly slideably passes the at least one aperture of the front plate and the at least one aperture of the rear plate, and the intermediate plate of the first assembly is interposed between the front plate and the rear plate; and,
   c. at least one air bag adjustably connecting the first assembly to the second assembly by connecting to the front plate and the intermediate plate, such that the position of the swing arm may be adjusted by changing the air pressure in the at least one air bag.

8. The adjustable air bag suspension of claim 7, further comprising a hydraulic damper connecting the second assembly to the swing arm.

9. The adjustable air bag suspension of claim 7, wherein the at least one air bag is two air bags.

10. The adjustable air bag suspension of claim 7, wherein the front plate and the rear plate each have two apertures and the first assembly has two slide rods slideably passing through the two apertures of the front plate and the two apertures of the rear plate.

11. The adjustable air bag suspension of claim 7, further comprising an air compressor.

12. The adjustable air bag suspension of claim 11, further comprising an air reservoir between the air compressor and air bag.

* * * * *